United States Patent Office 3,546,188
Patented Dec. 8, 1970

3,546,188
DEGRADED VINYL CHLORIDE RESINS DE-
COLORIZED WITH TRIALKYL ORTHO-
FORMATES
George Kesslin, Teaneck, N.J., and Charles M. Orlando,
Schenectady, and Herbert W. Blohm, Garnerville, N.Y.,
assignors to Kay-Fries Chemicals, Inc., West Haver-
straw, N.Y., a corporation of New York
No Drawing. Filed Sept. 27, 1967, Ser. No. 671,124
Int. Cl. C08f 45/58, 47/22
U.S. Cl. 260—86.3
2 Claims

ABSTRACT OF THE DISCLOSURE

Chlorine-containing vinyl resins, such as polyvinyl chloride, are stabilized against heat degradation by incorporating an effective amount of an orthoester, such as trialkyl orthoester, wherein the alkyl group contains from 4 to 18 carbon atoms, or two alkyl groups together form a cyclic structure. The orthoesters form synergistic mixtures with primary stabilizers to form clear vinyl plastics, and stabilize vinyl resin compositions against the degradative effects of zinc oxide contained therein, and can also be used to decolorize degraded vinyl resins.

BACKGROUND OF THE INVENTION

The present invention relates to the heat stabilization of halogen-containing vinyl resins, and to novel compounds suitable for that purpose.

It is well known that halogen-containing vinyl resins, and particularly those resins obtainable by the polymerization of a vinyl halide, such as vinyl chloride, are subject to discoloration and decomposition when exposed to elevated temperatures during their formation, compounding, and fabrication into various products. This discoloration or heat degradation is thought to be attributable to either the liberation of hydrogen halide, such as hydrogen chloride, or to partial oxidation of the resin, or both.

Efforts have been made in the prior art to combat this heat degradative tendency by the incorporation into the resin mixes of various primary heat stabilizers. Examples of such known primary stabilizers include lead compounds, such as dibasic lead phthalate, lead stearate, and lead salicylate. Their disadvantages are their toxicity, opacity, and staining by sulfur compounds. This staining comes from contact with sulfur compounds in the air. The largest class of primary heat stabilizers comprises the barium, cadmium, and zinc salts of fatty acids and phenols, which also possess some toxicity, and are generally used in conjunction with each other to obtain maximum effectiveness. Organic tin compounds, such as dibutyl tin dilaurate or tin mercaptides are highly effective as stabilizers, but their high cost and toxicity limit their use.

In U.S. Pat. 2,789,101 there is suggested the inclusion of triethyl orthoformate in a vinyl chloride composition as an auxiliary heat stabilizer in small amounts, in conjunction with a primary stabilizer such as a tin compound, to produce a synergistic stabilizing effect. The patent indicates that the triethyl orthoformate is not by itself sufficient to prevent heat decomposition, i.e., it is not a primary heat stabilizer. Experience has shown that at temperatures above about 150° C., triethyl orthoformate produces serious foaming, which renders it unsuitable as a primary heat stabilizer for clear vinyl plastics. This foaming is believed due to rapid evolution of volatile decomposition products formed by the reaction of the triethyl orthoformate with hydrogen chloride, thereby introducing bubbles into the resin.

The increasing use of higher processing temperatures has created a need for additives which will provide adequate heat stabilizing effects for vinyl resins, which are low in toxicity or nontoxic, and which will not produce foaming.

SUMMARY OF THE INVENTION

In accordance with the present invention, it has been found that certain higher molecular weight orthoesters act as effective primary and secondary heat stabilizers for halogen-containing vinyl resins, and particularly for vinyl chloride polymers. These orthoesters have the formula:

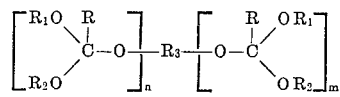

wherein $n$ is 1; $m$ is zero or 1; R is H, lower alkyl or aryl; and when $n$ is 1 and $m$ is zero: $R_1$, $R_2$ and $R_3$ are n-propyl, lower alkenyl, alkyl containing 4–18 carbon atoms, lower haloalkyl, aryl or aralkyl, or $R_1$ and $R_2$ together form a cyclic structure and $R_3$ is hydroxyalkyl; and when $n$ is 1 and $m$ is 1: $R_1$ and $R_2$ together form a cyclic structure and together are the same as $R_3$ which is lower alkylene.

The foregoing formula thus includes linear and cyclic orthoesters, and within the scope of the formula, examples of lower alkyl include methyl and ethyl and like lower alkyls; examples of lower haloalkyl include chloroethyl; examples of alkyl containing 4 to 18 carbon atoms include butyl, isobutyl, 2-ethylhexyl, isodecyl and stearyl; examples of lower alkenyl include $C_3$–$C_4$ alkenyl, such as allyl and propenyl and like lower alkenyls; examples of lower alkylene include —$CH_2CH_2$—, and

—$CH(CH_3)CH$— and examples of aryl include phenyl, and tolyl, and like alkphenyls, and examples of aralkyl include benzyl and phenethyl. In general, aryl radicals of the benzene series are preferred.

The nature and structure of the orthoesters which function as heat stabilizers, in accordance with the invention, will be better understood by reference to Table 1 below, listing examples of orthoesters and identifying the substituents R, $R_1$, $R_2$ and $R_3$, for each orthoester:

TABLE 1

Orthoester—  Substituents

When R is H: $R_1$, $R_2$ and $R_3$ are:
  Trichloroethyl orthoformate _____ Chloroethyl.
  Tripropyl orthoformate _____ Propyl.
  Triisobutyl orthoformate _____ Isobutyl.
  Tributyl orthoformate _____ Butyl.
  Tri-(2-ethylhexyl)orthoformate _____ 2-ethylhexyl.
  Triisodecyl orthoformate _____ Isodecyl.
  Tristearyl orthoformate _____ Stearyl.
  Triallyl orthoformate _____ Allyl.
  Tripropenyl orthoformate _____ Propenyl.
  Ethylene glycol bis orthoformate ____ Ethylene.
  Propylene glycol bis orthoformate __ Propylene.
  Triphenyl orthoformate _____ Phenyl.
  Tribenzyl orthoformate _____ Benzyl.

When R is lower alkyl: $R_1$, $R_2$ and $R_3$ are:
  Tri-(2-ethylhexyl)orthoacetate _____ 2-ethylhexyl.
  Tri-(2-ethylhexyl)orthopropionate ___ 2-ethylhexyl.

When R is aryl: $R_1$, $R_2$ and $R_3$ are:
  Triallyl orthobenzoate _____ Allyl.
Trimethylolpropane orthoformate (4-ethyl-2,6,7-trioxabicyclo-(2,2,2) octane).
Polyglycerol orthoformate.

The compounds listed in Table 1 are known compounds with the exception of tri-(2-ethylhexyl)orthoacetate, tri- 2-ethylhexyl)orthopropionate, triallyl orthobenzoate and propeylene glycol bis-orthoformate, which has the following structural formula:

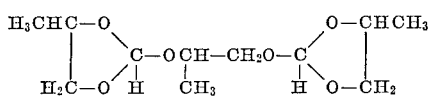

The preparation of these and other novel compounds is described in the examples below.

The orthoesters which are employed as heat stabilizers in accordance with the invention exhibit freedom from foaming and from any tendency toward reducing the transparency of the resin, even when used at higher operating temperatures in the range of 175° to 200° C. These higher temperatures are considered desirable in processing because they impart improved physical characteristics to thte vinyl resin compositions.

The orthoesters of the invention form synergistic mixtures with all known types of primary stabilizers whereby synergistic heat stabilization effects are obtained. Because of this synergism, lesser amounts of the conventional primary stabilizers can be used. This is of importance since the use of lesser amounts of, for example, the metal stabilizers, tends to reduce toxicity problems, staining, and to improve resistance to ultra-violet light.

Synergistic effects are also obtained when the orthoester stabilizers of the invention are used in conjunction with known secondary stabilizers, such as epoxy compounds and phosphites, for example octyl epoxy tallate and triphenyl phosphite.

In accordance with a further aspect of the invention, it has been found, surprisingly and unexpectedly, that the orthoesters of the invention, as illustrated in Table 1, and also including tricrotyl orthoformate and triethyl orthoformate, remove color from degraded vinyl resins. This property is useful in the recovery of good quality vinyl resins from degraded or scrap material. The triallyl orthoformate listed in Table 1 is also quite effective.

Another unexpected property of the orthoester stabilizers of the invention is that when admixed with vinyl resin compositions containing zinc oxide, they serve to offset the rapid and extensive degradation of the vinyl resin with formation of black colors produced by the zinc oxide. Specimens to which the orthoesters were added remained a sparkling white color.

The halogen-containing vinyl resins with which the orthoesters of the inventtiton may be incorporated as primary or secondary heat stabilizers include those derived by polymerization of vinyl halides, such as vinyl chloride or vinyl bromide, as well as vinylidene chloride, and copolymers of vinyl halides or vinylidene halides with otther copolymerizable olefinic monomers, such as vinyl acetate, methyl methacrylate, methyl acrylate, and the like.

Where the orthoesters of the invention are used as primary heat stabilizers, the amount added will ordinarily range between 1 and about 10 percent by weight of the vinyl resin. Where the orthoesters are employed as secondary heat stabilizers in admixture with conventional stabilizers, the amount will range from about .1 to about 5 percent by weight of the vinyl resin.

It will be understood that the resin formulations may also include other conventional ingredients, such as plasticizers, for example, dioctyl phthalate, tricresyl phosphate, and the like, as well as lubricants, including waxes, metal soaps of fatty acids, mineral oils, and the like.

DESCRIPTION OF THE PREFERRED EMBODIMENTS

The following examples illustrate the practice of the various aspects of the invention, but are not to be regarded as limiting:

EXAMPLE 1

Preparation of 1,2-propylene glycol bis-orthoformate and 2-hydroxypropyl-propylene orthoformate 1,2-propylene glycol (913 g.) and trimethyl orthoformate (848 g.) are loaded into a 3 liter flash equipped with a 2 ft. adiabatic column and a magnetically controlled total reflux-partial takeoff head. The mixture is heated between 95–160° C. for 17 hours during which time 752 g. of methanol (98% of 3-mole-equivalent) distilled. At various intervals, four 1 gm. portions of glacial acetic acid were added to the flask to catalyze the formation of alcohol. An additional amount of 1,2-propylene glycol (304 g.) was added after about ⅔ of the methanol had been collected.

The residue was treated with 5 g. of $Na_2CO_3$ and distilled under reduced pressure. After the removal of the unreacted 1,2-propylene glycol there was obtained 515 gms. of 2-hydroxypropyl propylene orthoformate boiling at 90–92° C./3 mm. S.G. at 20° C. 1.1042, R.I. $n_D^{20}$ 1.4379 of the formula:

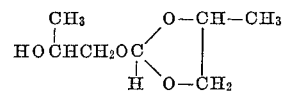

and 169 g. of 1,2-propylene glocol bis orthoformate boiling at 112–117° C./1 mm. R.I. $n_D^{20}$—1.4422, S.G. 20/20—1.1377.

EXAMPLE 2

Preparation of hydroxyethyl ethylene orthoformate

In the preparation of ethylene glycol bis-orthoformate, by the reaction of 12 mols of trimethyl orthoformate with 18 mols of ethylene glycol, there was isolated by distillation (in addition to the main product) 264 gms. of hydroxyethyl ethylene orthoformate boiling at 82–85° C./1.3 mm. S.G. at 20° C. 1.2288, R.I. $n_D^{20}$ 1.4469, of the formula:

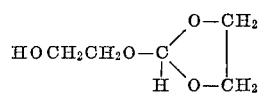

EXAMPLE 3

Preparation of tri-2-ethylhexyl orthoacetate

One mol of triethyl orthoacetate (162 gms.) was mixed and heated to reflux with 3 mols of 2-ethyl hexanol (390 gms.). The ethanol produced during the reaction was removed by distillation until the equivalent of 3 mols was obtained. A small amount of low boiling product was removed by distillation and there was obtained 354.8 gms. of tri-2-ethylhexyl orthoacetate boiling at 163–166° C./1.3 mm. The product assayed 99.57% as tri-2-ethylhexyl orthoacetate and had a S.G. at 20° C. 0.8669 and R.I. $n_D^{20}$ 1.4415.

EXAMPLE 4

Preparation of tri-2-ethylhexyl orthopropionate

Tri-2-ethlhexyl orthopropionate was obtained in the same manner as above by mixing and heating to reflux 1 mol of triethyl orthopropionate (176 gms.) and 3 mols of 2-ethyl hexanol (390 gms.). The ethanol was removed as formed until 3 mol equivalent was obtained. After the removal of a small amount of low boiling product by distillation, there was obtained 394.6 gms. of tri-2-ethylhexyl orthopropionate boiling at 160–164° C./0.8 mm. The product assayed 99.47% as tri-2-ethylhexyl orthopropionate and had a S.G. at 20° C. 0.8679 and R.I. $n_D^{20}$ 1.4423.

EXAMPLE 5

Preparation of tricrotyl orthoformate

Ten mols of triethyl orthoformate (1480 gms.) were mixed and heated to reflux with 40 mols of crotyl alcohol (2880 gms.). The ethanol produced during the reaction was removed by distillation until 3 mol equivalent was obtained. The excess crotyl alcohol was removed and there was obtained 2010 gms. of tricrotyl orthoformate boiling at 133–135° C./11 mm. The product assayed 100.4% as tricrotyl orthoformate and had a S.G. at 20/20° C. 0.9285 and R.I. $n_D^{20}$ 1.4543.

EXAMPLE 6

Preparation of triallyl orthobenzoate

A mixture of 321 gms. (1.7 mols) of trimethyl orthobenzoate and 354 gms. (6.1 mols) of allyl alcohol was heated to reflux and 88% of 3 mol equivalent of methanol removed by distillation. The excess allyl alcohol was removed and there was obtained 132.6 gms. of triallyl orthobenzoate boiling at 96–100° C./0.75 mm. The product assayed 100.3% as triallyl orthobenzoate and had a S.G. at 20/20° C. 1.0180, R.I. $n_D^{20}$ 1.4991.

EXAMPLE 7

Preparation of polyglycerol orthoformate

Trimethyl orthoformate (212 gms. 2 mols) and glycerol (276 gms.—3 mols) were mixed together and heated to reflux in 300 ml. of p-xylene. After all of the methanol produced by the reaction had been removed (6 mol equivalent) the excess p-xylene was removed by flash evaporation. The viscous residue consisted of 264.4 gms. of polyglycerol orthoformate.

EXAMPLE 8

Comparative tests of foaming properties

Polyvinyl chloride sheets were molded to 15–20 mils thickness at 180° C. from a mix containing 66 parts by weight of polyvinyl chloride, and 34 parts of di(2-ethylhexyl)phthalate plasticizer. One batch included 1.6 parts of triethyl orthoformate, and a second batch contained 4.3 parts of tri-(2-ethylhexyl)orthoformate. The sheet produced with the triethyl orthoformate was extremely foamy, with reduced transparency, whereas the sheet formed with tri-(2-ethylhexyl) orthoformate was foam-free and clear.

EXAMPLE 9

Effect of orthoesters on vinyl chloride containing zinc oxide

Test samples were prepared containing amounts of zinc oxide ranging from 0.1% to 1.0% parts per hundred parts of resin, and 3 parts per hundred of triallyl orthoformate, by heating at 180° C. for 25 minutes. The results are shown in the following table:

TABLE 2

| Phr., ZnO | Phr., TAOF | Color of TAOF–ZnO |
|---|---|---|
| 0.1 | | 1 12 |
| | 3 | 1 3 |
| 0.1 | 3 | 1 |
| 0.2 | 3 | 1 |
| 0.3 | 3 | 1 |
| 0.4 | 3 | 1 |
| 0.5 | 3 | 1 |
| 1.0 | 3 | 1 |

1 Control.

Tri-(2-ethylhexyl) orthoformate produces the same results when 6.5 phr. are added to the test sample containing 0.5 phr. of ZnO. A color of 1 is obtained.

This is a very unusual property since the addition of ZnO to the PVC resin causes extensive and rapid degradation with the formation of black colors.

EXAMPLE 10

Color removal from degraded polyvinyl chloride

A sample of brown-black degraded PVC with a color of 12 was immersed in test tubes containing the orthoester for various time periods. Color removal was accelerated by heating for a short time.

TABLE 3

| Compound | Color class | | |
|---|---|---|---|
| | 2 weeks | 2 months | 1 hour at 100° C. |
| Triallyl orthoformate | 8 | 2 | |
| Tricrotyl orthoformate | 3 | 1 | 3 |
| Triethyl orthoformate | 8 | 3 | |
| Control | 12 | 12 | 12 |

After a period of 2 weeks to 2 months' immersion in triethyl orthoformate, triallyl orthoformate or tricrotyl orthoformate the colors of the polyvinyl chloride ranged from light straw to white. Color removal was also accomplished by heating for 1 hour at 100° C., or other elevated temperature up to about 180° C.

EXAMPLE 11

Investigation of comparative heat stability

Polyvinyl chloride resin powder (100 parts) was dispersed in 60 parts of di-(2-ethylhexyl) phthalate. This constituted the plastisol stock solution from which the test samples were prepared.

Test samples were prepared by weighing 16 gms. of the stock solution into an open aluminum dish (2″ dia.) or covered glass vial. The amount of stabilizer specified in the tables was added and mixed. The sample was then deaerated by vacuum, and placed in a mechanically convected oven at 180° C.±20° C. for the indicated time. A control containing no stabilizer was always included in the tests. This test procedure was used for results obtained in Tables 4 and 5.

The discoloration of the samples was evaluated by using the following color scale:

(1) white
(2) white-yellowish
(3) yellowish
(4) light yellow
(5) yellow
(6) dark yellow
(7) orange
(8) very light brown
(9) light brown
(10) brown
(11) dark brown
(12) very dark brown The following tables serve to illustrate the use of ortho esters as heat stabilizers. All additives are listed on a phr. basis (phr.=parts of additive per hundred parts or resin). Table 4 gives evidence of ortho esters acting as primary stabilizers while Table 5 shows synergism with conventional primary and secondary stabilizers.

TABLE 4.—COMPARISON OF THE ORTHOESTERS AT THE SAME WEIGHT PERCENT LEVEL, 3 PHR.

[Time, 20 minutes; Temperature, 180° C.]

| Orthoester | Color class | Foaming |
|---|---|---|
| Trimethyl orthoformate | 3 | Yes. |
| Triethyl orthoformate | 3 | Yes. |
| Triallyl orthoformate | 4 | No. |
| Tripropenyl orthoformate | 1 | No. |
| Tripropyl orthoformate | 3 | No. |
| Tri-isobutyl orthoformate | 3 | No. |
| Tricrotyl orthoformate | 6 | Yes. |
| Tribenzyl orthoformate | 5 | No. |
| Tri-(2-ethylhexyl) orthopropionate | 5 | No. |
| Tri-isodecyl orthoformate | 5 | No. |
| Trichloro-ethyl orthoformate | 5 | No. |
| 4-ethyl-2,6,7-trioxabicyclo(2,2,2)octane | 4 | No. |
| Triethyl orthoacetate | 2 | Yes. |
| Triethyl orthopropionate | 2 | No. |
| Triallyl orthobenzoate | 1 | No. |
| 1,2-propylene glycol bis-orthoformate | 4 | No. |
| Tributyl orthoformate | 4 | No. |
| Ethylene glycol bis-orthoformate | 3 | No. |
| Control | 9 | No. |

As can be seen from the above data, each orthoester was used as a primary heat stabilizer. In every case the color of the test sample was very much better than the control. However, the orthoesters with alkyl groups less than $C_4$ generally produce a foamy sample, with the exception of the $C_3$ group compounds disclosed herein, viz. tripropenyl, tripropyl and triallyl orthoformates.

TABLE 5.—SYNERGISTIC HEAT STABILIZATION BY MIXTURES OF ORTHOESTERS WITH CONVENTIONAL STABILIZERS

[Time, 30 minutes; Temperature, 180° C.]

| Stabilizer | Amount, phr. | Color |
|---|---|---|
| Tin stearate | 0.5 | 12 |
| Triallyl orthoformate with tin stearate | 3+0.5 | 1 |
| Triallyl orthoformate | 3 | 5 |
| Triallyl orthoformate with an organotin mercaptide (a polymeric tin mercaptide obtainable from Carlisle Chemicals, Inc., under the trade name Advastab TM-210) | 3+0.2 | 1 |
| Organotin mercaptide (a polymeric tin mercaptide obtainable from Carlisle Chemicals, Inc., under the trade name Advastab TM-210) | 0.2 | 10 |
| Triallyl orthoformate with triphenyl phosphite | 3+1 | 2 |
| Triphenyl phosphite | 1 | 11 |
| Tribenzyl orthoformate with a liquid barium/cadmium (mixed phenates of barium and cadmium obtainable from Argus Chemical Corp., under the trade name Mark LL) | 1+1 | 2 |
| Liquid barium/cadmium (mixed phenates of barium and cadmium obtainable from Argus Chemical Corp., under the trade name Mark LL) | 1 | 9 |
| Tribenzyl orthoformate with a liquid barium/cadmium/zinc (mixed Ba/Cd/Zn carboxylates obtainable from Carlisle Chemicals, Inc., under the trade name Advastab BC-206) | 1+1 | <2 |
| Liquid barium/cadmium/zinc (mixed Ba/Cd/Zn carboxylates obtainable from Carlisle Chemicals, Inc., under the trade name Advastab BC-206) | 1 | 12 |
| Tribenzyl orthoformate with a liquid calcium/zinc (mixed Ca/Zn carboxylates obtainable from Tenneco Chemicals, Inc., under the trade name Nuostab V-1057) | 1+1.3 | <2 |
| Liquid calcium/zinc (mixed Ca/Zn carboxylates obtainable from Tenneco Chemicals, Inc., under the trade name Nuostab V-1057) | 1.3 | 12 |
| Tribenzyl orthoformate with an organo tin mercaptide | 1+.35 | <2 |
| Organotin mercaptide (a polymeric tin mercaptide obtainable from Carlisle Chemicals, Inc., under the trade name Advastab TM-210) | .35 | 10 |
| Ethylene glycol bis-orthoformate with an organotin mercaptide (a polymeric tin mercaptide obtainable from Carlisle Chemicals, Inc., under the trade name Advastab TM-210) | .35+.35 | <2 |
| Hydroxyethyl ethylene orthoformate with an organotin mercaptide (a polymeric tin mercaptide obtainable from Carlisle Chemicals, Inc., under the trade name Advastab TM-210) | 1+.35 | 2 |
| Control (no additives) | | 12 |

What is claimed is:

1. Method for the removal of color from a degraded chlorine-containing vinyl resin comprising immersing said vinyl resin in a trialkyl orthoformate for a sufficient time to effect said color removal.

2. The method of claim 1 in which said treatment is performed at an elevated temperature.

References Cited

UNITED STATES PATENTS 2,789,101  4/1957  Wilson _____ 260—31.8
3,354,100  11/1967  Kuryla _____ 260—2.5

FOREIGN PATENTS 1,488,543  7/1967  France.

DONALD E. CZAJA, Primary Examiner

R. A. WHITE, Assistant Examiner

U.S. Cl. X.R.

260—23, 45.7, 45.75, 45.8, 87.1, 92.8

PO-1050
(5/69)

UNITED STATES PATENT OFFICE
CERTIFICATE OF CORRECTION

Patent No. 3,546,188           Dated Dec. 8, 1970

Inventor(s) George Kesslin, Charles M. Orlando, Herbert W. Blohm

It is certified that error appears in the above-identified patent and that said Letters Patent are hereby corrected as shown below:

Column 3, line 21, correct the spelling of "the";
Column 3, line 51, correct the spelling of "invention";
Column 3, line 55, correct the spelling of "other";
Column 4, line 5, "flash" should be --flask--;
Column 4, line 1 following the first formula, correct the spelling of "glycol";
Column 4, line 29, "1.1377" should be --1.1317--;

SIGNED AND
SEALED
MAR 9 1971

(SEAL)
Attest:

Edward M. Fletcher, Jr.
Attesting Officer

WILLIAM E. SCHUYLER, JR.
Commissioner of Patents